(12) United States Patent
Ting et al.

(10) Patent No.: US 11,700,294 B2
(45) Date of Patent: Jul. 11, 2023

(54) VIDEO-CALL USER EXPERIENCE TESTING AND ASSURANCE

(71) Applicant: ARRIS Enterprises LLC, Suwanee, GA (US)

(72) Inventors: See Ho Ting, Singapore (SG); Rajiv Iyer, Los Altos, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 7 days.

(21) Appl. No.: 17/552,611

(22) Filed: Dec. 16, 2021

(65) Prior Publication Data

US 2022/0217196 A1 Jul. 7, 2022

Related U.S. Application Data

(60) Provisional application No. 63/134,683, filed on Jan. 7, 2021.

(51) Int. Cl.
| | |
|---|---|
| *H04L 65/80* | (2022.01) |
| *G06N 20/00* | (2019.01) |
| *H04L 41/0677* | (2022.01) |
| *H04L 41/0631* | (2022.01) |

(52) U.S. Cl.
CPC ............ *H04L 65/80* (2013.01); *G06N 20/00* (2019.01); *H04L 41/0631* (2013.01); *H04L 41/0677* (2013.01)

(58) Field of Classification Search
None
See application file for complete search history.

(56) References Cited

U.S. PATENT DOCUMENTS

| | | | |
|---|---|---|---|
| 10,868,920 B1* | 12/2020 | Kodimer | ................. H04L 51/56 |
| 2018/0270126 A1* | 9/2018 | Tapia | ...................... H04L 41/16 |
| 2018/0287901 A1* | 10/2018 | Bisada | ................ H04L 41/0631 |
| 2022/0191087 A1* | 6/2022 | Mishra | ................ H04L 41/0636 |

* cited by examiner

*Primary Examiner* — Jonathan A Bui
(74) *Attorney, Agent, or Firm* — Steven Stupp; Stewart Wiener (57) ABSTRACT

During operation, an electronic device receives, from a second electronic device in a network, a request for testing. In response, the electronic device set ups a video call with a video-call service. Then, the electronic device provides, to the second electronic device, an invitation for the video call. When the electronic device receives a notification (e.g., from the video-call service) that the video call has started, the electronic device provides content via the video-call service for the second electronic device. Next, the electronic device obtains communication-performance metrics associated with communication via the network during the video call and video-service performance metrics associated with the video call. Furthermore, the electronic device diagnoses a type of problem experienced at the second electronic device during the video call based at least in part on the communication-performance metrics, the video-service performance metrics and a pretrained machine-learning model.

20 Claims, 7 Drawing Sheets

VIDEO-CALL USER EXPERIENCE TESTING AND ASSURANCE

CROSS REFERENCE TO RELATED APPLICATIONS

This application claims priority under 35 U.S.C. 119(e) to: U.S. Provisional Application Ser. No. 63/134,683, "Video-Call User Experience Testing and Assurance," filed on Jan. 7, 2021, by See Ho Ting, the contents of which are herein incorporated by reference.

FIELD

The described embodiments relate to techniques for assessing and diagnosing video-call problems based at least in part on performance metrics, such as network communication-performance metrics and video-call performance metrics, using machine learning.

BACKGROUND

Video calls provided by video-call services or platforms, such as Zoom (from Zoom Video Communications of San Jose, Calif.), Microsoft Teams (from Microsoft Corporation of Redmond, Wash.) and WebEx (from Cisco Systems of San Jose, Calif.), are increasingly popular. This trend has been accelerated by the need for remote-work environments during the COVID-19 pandemic.

Typically, video calls are a demanding application in many systems. Notably, video calls typically consume a large amount of network resources and often have demanding communication-performance requirements, including: high bandwidth, and low latency and jitter. Consequently, network problems that degrade the communication performance can adversely impact the quality of service or user experience during video calls.

However, a wide variety of other types of problems can also adversely impact the quality of service or user experience during video calls. This diversity complicates attempts by users to diagnose and correct problems when they occur. In turn, difficulties in addressing the problems often results in compromised video calls, which is frustrating to users.

SUMMARY

An electronic device is described. This electronic device includes: an interface circuit that communicates with second electronic device, which is included in a network, and a computer associated with a video-call service; memory that stores program instructions; a processor that executes the program instructions. During operation, the interface circuit receives, associated with the second electronic device, a request for testing. In response, the interface circuit provides, addressed to the computer, a request for a video call. Then, the interface circuit receives, associated with the computer, information specifying an address associated with the video call. Moreover, the interface circuit provides, addressed to the second electronic device, an invitation for the video call, where the invitation includes address information corresponding to the address. When the interface circuit receives, associated with the computer, a notification that the video call has started, the interface circuit provides content addressed to the computer and intended for the second electronic device. Next, the interface circuit obtains communication-performance metrics associated with communication via the network during the video call and video-service performance metrics associated with the video call. Furthermore, the electronic device diagnoses a type of problem experienced at the second electronic device during the video call based at least in part on the communication-performance metrics, the video-service performance metrics and a pretrained machine-learning model.

Note that the address information specifying the address may include a selectable link to the address, such as a hypertext link.

Moreover, the content may include audio and/or video. The content may be predefined. (However, in other embodiments, the content may be dynamic, such as content that is provided by two or more parties in a test call.) For example, the content may test performance of the network and/or the video-call service. In some embodiments, the electronic device may select the content based at least in part on an estimated type of problem experienced at the second electronic device. Notably, the electronic device may estimate the type of problem based at least in part on information included in the request for the testing.

Furthermore, the communication-performance metrics may include end-to-end communication performance, e.g., from a gateway or a switch to the second electronic device. In some embodiments, the communication-performance metrics include communication-performance metrics associated with a backhaul network.

Additionally, the video-service performance metrics may be obtained from the computer.

In some embodiments, the electronic device may provide, addressed to the second electronic device, corrective information that specifies the diagnosed type of problem. Note that the corrective information may include or specify a remedial action to correct the diagnosed type of problem. Alternatively or additionally, the electronic device may selectively perform the remedial action to the correct the diagnosed type of problem. For example, the remedial action may include: an adjustment or modification to the network, a change in a configuration of the video-call service, and/or an alert or an alarm.

Moreover, the electronic device may include an integrated circuit that implements a pretrained machine-learning model. For example, the integrated circuit may include one or more graphical processor units (GPUs).

Furthermore, the pretrained machine-learning model may include a neural network or another type of supervised-learning model.

Note that the diagnosed type of problem may include one or more types of problems in the network and/or with the video-call service. Alternatively or additionally, the diagnosed type of problem may identify where an anomaly or an error is occurring in the network and/or the video-call service.

Additionally, the communication-performance metrics and the video-service performance metrics may be inputs to the pretrained machine-learning model, and the diagnosed type of problem may be an output from the pretrained machine-learning model. Moreover, the electronic device may use the inputs and the output to dynamically update or retrain the machine-learning model.

Furthermore, the diagnosed type of problem may indicate an absence of a problem. For example, the diagnosed type of problem may indicate that the second electronic device (and, thus, the network) is 'video-call ready.'

In some embodiments, some of the aforementioned operations are automated. For example, after receiving the request for the testing, the remaining operations may be performed without human intervention or automatically. This may allow a user of the second electronic device to initiate the testing and diagnosis of the type of problem by performing a single operation, such as providing the request for the testing. Alternatively, the user may need to perform two operations, such as providing the request for the testing and then accepting the invitation, e.g., by activating the selectable link that may be included in the invitation. Moreover, during the video call, the content may be provided, via the computer, to the second electronic device, but may not be presented to the user of the second electronic device. This may allow the testing to be conducted in the background without disrupting the user's normal activities.

Furthermore, in other embodiments, the aforementioned operations may be performed in conjunction with a wide variety of services (instead of a video-call service) and/or a wide variety of networks (such as a cellular-telephone network).

Additionally, in some embodiments, at least some of the content may be provided by a component in the network instead of or in addition to the electronic device. This capability may facilitate assessing communication performance of a portion of the network and, thus, diagnosing the type of problem.

Another embodiment provides the integrated circuit.

Another embodiment provides the computer associated with a video-call service.

Another embodiment provides a second electronic device. This second electronic device may perform counterpart operations to the operations performed by the electronic device and/or the computer. For example, the second electronic device may receive user-interface activity specifying a request for testing. Then, the second electronic device may provide, addressed to the second electronic device, the request for testing. Moreover, the second electronic device may receive, associated with the second electronic device, an invitation for a video call, where the invitation includes address information corresponding to an address of the video call, and may receive second user-interface activity accepting the invitation. Next, the second electronic device may provide, addressed to the computer, an acceptance message, where the acceptance message includes the address, and may receive, associated with the computer, content during the video call. Furthermore, the second electronic device may receive, associated with the second electronic device, corrective information specifying a type of problem experienced at the electronic device during the video call, where the diagnosed type of problem is associated with the network and/or the video-call service.

Note that the second electronic device may not display or present the content during the video call. Moreover, the corrective information may include or specify a remedial action to correct the diagnosed type of problem.

Another embodiment provides a user interface for display on the second electronic device. This user interface may allow a user of the second electronic device to perform at least some counterpart operations to the operations performed by the electronic device and/or the computer.

Another embodiment provides a computer-readable storage medium for use with the electronic device, the computer or the instance of the second electronic device. This computer-readable storage medium may include program instructions that, when executed by the electronic device, the computer or the instance of the second electronic device, cause the electronic device, the computer or the instance of the second electronic device to perform at least some of the aforementioned operations.

Another embodiment provides a method. This method includes at least some of the operations performed by the electronic device, the computer or the instance of the second electronic device.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device is described. During operation, the electronic device receives, from a second electronic device in a network, a request for testing. In response, the electronic device provides, to a computer associated with a video-call service, a request for a video call. Then, the electronic device receives, from the computer, information specifying an address associated with the video call. Moreover, the electronic device provides, to the second electronic device, an invitation for the video call, where the invitation includes address information corresponding to the address. When the electronic device receives, from the computer, a notification that the video call has started, the electronic device provides content to the computer for the second electronic device. Next, the electronic device obtains communication-performance metrics associated with communication via the network during the video call and video-service performance metrics associated with the video call. Furthermore, the electronic device diagnoses a type of problem experienced at the second electronic device during the video call based at least in part on the communication-performance metrics, the video-service performance metrics and a pretrained machine-learning model.

By diagnosing the type of problem, these communication techniques may facilitate improved quality of service or an improved user experience when using the video-call service. Notably, the communication techniques may facilitate root-cause analysis and appropriate corrective action. For example, the electronic device may optionally provide, to the second electronic device, corrective information that specifies the diagnosed type of problem and/or that includes or specifies a remedial action to correct the diagnosed type of problem. Alternatively or additionally, the electronic device may selectively perform the remedial action to the correct the diagnosed type of problem. Consequently, the communication techniques may enhance the user experience when using the video-call service.

In the discussion that follows, electronic devices or components in a system communicate packets or frames in accordance with a wireless communication protocol, such as: a wireless communication protocol that is compatible with an IEEE 802.11 standard (which is sometimes referred to as from the Wi-Fi Alliance of Austin, Tex.), Bluetooth (from the Bluetooth Special Interest Group of Kirkland, Wash.), a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another WLAN interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station, a router or a switch in the network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. In some embodiments, a radio node may include: an Evolved Node B (eNodeB), a Universal Mobile Telecommunications System (UMTS) eNodeB and radio network controller (RNC), a New Radio (NR) gNB or gNodeB (which communicates with a network with a cellular-telephone communication protocol that is other than LTE), etc. However, a wide variety of communication protocols may be used in the system, including wired and/or wireless communication. In the discussion that follows, Wi-Fi and Ethernet are used as illustrative examples.

Figure 1:
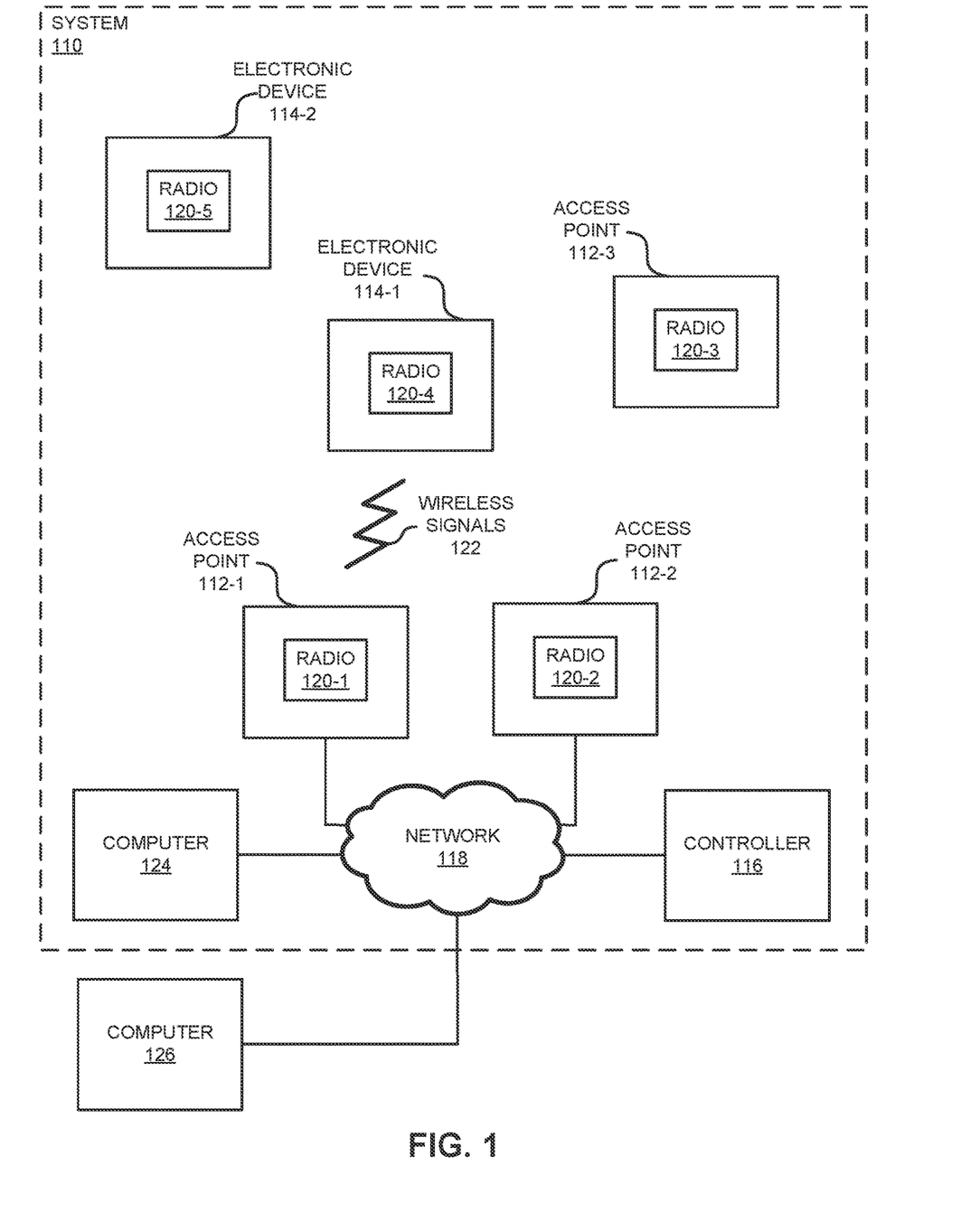
FIG. 1 is a block diagram illustrating an example of a system in accordance with an embodiment of the present disclosure.

We now describe some embodiments of the communication techniques. FIG. 1 presents a block diagram illustrating an example of a system, which may include components, such as: one or more access points 112, one or more electronic devices 114 (such as cellular telephones, stations or clients, another type of electronic device, etc.), controller 116 and computer 124. In FIG. 1, one or more of the one or more access points 112 may wirelessly communicate with one or more of the one or more electronic devices 114 using wireless communication that is compatible with an IEEE 802.11 standard. Thus, the wireless communication may occur in, e.g., a 2.4 GHz, a 5 GHz, a 6 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 112 may communicate with controller 116 via network 118 (such as the Internet, an intra-net and/or one or more dedicated links). Note that controller 116 may be at the same location as the other components in FIG. 1 or may be located remotely (i.e., at a different location, such as a cloud-based controller). Moreover, note that the one or more access points 112 may be managed and/or configured by controller 116. Furthermore, note that at least one of the one or more access points 112 may provide access to network 118 (e.g., via an Ethernet protocol), and may be a physical access point or a virtual or 'software' access point that is implemented on a computer or an electronic device. In some embodiments, one or more of access points 112 (such as access point 112-3) may communicate wirelessly with at least another of access points 112 (such as access point 112-2). Thus, access point 112-3 may be a mesh access point in a mesh network, and access point 112-2 may be a root access point in the mesh network. While not shown in FIG. 1, there may be additional components or electronic devices, such as a switch or a router.

Additionally, as noted previously, the one or more access points 112 and the one or more electronic devices 114 may communicate via wireless communication. Notably, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 7:
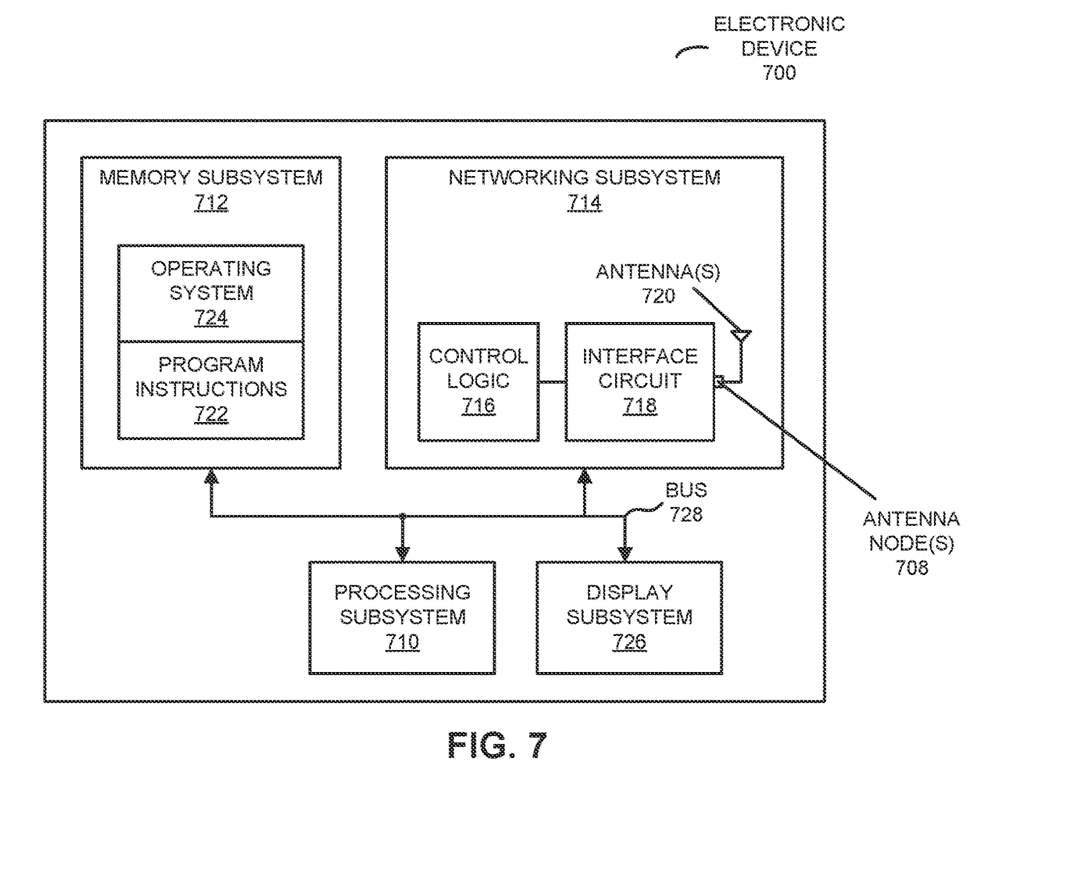
FIG. 7 is a block diagram illustrating an example of an electronic device in accordance with an embodiment of the present disclosure.

As described further below with reference to FIG. 7, the one or more access points 112, the one or more electronic devices 114 and/or controller 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-4 in electronic device 114-1. These wireless signals are received by a radio in at least one of the one or more access points 112, such as radio 120-1 in access point 112-1. Notably, electronic device 114-1 may transmit frames or packets. In turn, these frames or packets may be received by access point 112-1. This may allow electronic device 114-1 to communicate information to access point 112-1. (Similarly, access points 112-2 and 112-3 may communicate packets or frames with each other.) Note that the communication between two or more components in FIG. 1 (such as between electronic device 114-1 and access point 112-1, between access points 112-2 and 112-3, between electronic device 114-1 and a gateway to network 118, between electronic device 114-1 and computer 126 associated with a video-call service) may be characterized by a variety of communication-performance metrics, such as: a data rate, a data rate for successful communication (which is sometimes referred to as a 'throughput'), an error rate (such as a retry or reseed rate), a mean-square error of equalized signals relative to an equalization target, intersymbol interference, multipath interference, a signal-to-noise ratio, multiuser interference (such as airtime busy), multiuser access availability (such as airtime utilization), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to 'utilization'). While instances of radios 120 are shown in the one or more electronic devices 114 and the one or more access points 112, one or more of these instances may be different from the other instances of radios 120.

As noted previously, video calls are a demanding application in many systems. However, it is often difficult to assess or test whether communication among components in FIG. 1 (such as between electronic device 114-1 and access point 112-1) is sufficient for a video-call service (and, thus, whether a local area network or LAN, a wireless local area network or WLAN and/or, more generally, a network that includes electronic device 114-1 is 'video-call ready'). Moreover, when a type of problem occurs at electronic device 114-1 during a video call, it is typically difficult to troubleshoot (e.g., to diagnose and/or to correct) the type of problem (e.g., in real time or while the type of problem is occurring). In order to address these challenges, one or more of access points 112 and/or computer 124 (or controller 116) may use or implement embodiments of the communication techniques.

Notably, a user of electronic device 114-1 may instruct electronic device 114-1 to provide a request for testing. For example, the user may activate a physical button or a virtual icon in or associated with a user interface that is displayed on electronic device 114-1, such as a user interface associated with the video-call service. In response, electronic device 114-1 may provide the request for the testing to computer 124. (While the preceding discussion illustrated the communication techniques with the user of electronic device 114-1 instructing electronic device 114-1 to provide a request, in other embodiments another entity, e.g., a provider of an analytics service or a provider of a video-call service, may schedule a test for electronic device 114-1. Consequently, in these embodiments, a request for a test call may or may not come directly from electronic device 114-1.)

After receiving the request for the testing, computer 124 may provide a request for a video call to computer 126 based at least in part on the request for the testing received from electronic device 114-1. Moreover, after receiving the request for the video call, computer 126 may schedule the video call and may provide information specifying an address (such as an Internet Protocol or IP address) associated with the video call to computer 124.

In response to receiving this information, computer 124 may provide an invitation for the video call to electronic device 114-1, where the invitation includes address information corresponding to the address. For example, computer 124 may provide a message (such as an email or a text message) with the address information. Note that the address information in the message may include a selectable link to the address, such as a hypertext link.

The user of electronic device 114-1 may accept the invitation, e.g., by activating the link (such as by clicking on the link or activating a virtual icon in a user interface). After receiving the acceptance of the invitation, computer 126 may start the video call, and may notify computer 124 that the video call has started. Then, during the video call, computer 124 may provide content to electronic device 114-1 via computer 126. This content may include audio and/or video. In some embodiments, the content may be predefined. (However, in other embodiments, the content may be dynamic, such as content that is provided by two or more parties in a test call.) For example, the content may test performance of the network and/or the video-call service. Moreover, computer 124 may select the content from a set of predefined content based at least in part on an estimated type of problem experienced at electronic device 114-1. Note that computer 124 may estimate the type of problem based at least in part on information included in the request for the testing, such as a description of attributes or characteristics of one or more video calls (e.g., slow, low resolution or noisy, delayed, etc.).

The providing of the content may be unidirectionally provided from computer 124 to electronic device 114-1. Alternatively or additionally, at least some of the content may be provided based at least in part on a dynamic, bidirectional interaction with the user of electronic device 114-1. However, in some embodiments, while the content is provided to electronic device 114-1, electronic device 114-1 may not display or present the content to the user. This may allow the testing to be performed or conducted in the background, e.g., the user may not need to discontinue their normal activities while the testing is performed. Consequently, after requesting the testing and/or accepting the invitation, the communication techniques may be performed without further action or awareness of the user.

While the video call is ongoing or once the video call is completed (e.g., when the testing is completed, such as after 1-3 min.), computer 124 may obtain one or more communication-performance metrics associated with communication with electronic device 114-1 (e.g., via access point 112-1 or a WLAN and/or a LAN or a network) during the video call. For example, computer 124 may obtain the one or more communication-performance metrics from one or more of access points 112 and/or controller 116. Note that the communication-performance metrics may include end-to-end communication performance, e.g., from a gateway or a switch to electronic device 114-1. In some embodiments, the communication-performance metrics include communication-performance metrics associated with a backhaul network from the gateway or switch to computer 126 via network 118. Note that the one or more communication-performance metrics may include: a signal-to-noise ratio, interference, a modulation coding scheme (including a data rate), over-air throughput, a dynamic host control protocol (DHCP) failure, a RADIUS or an authentication and authorization failure, retries, and/or information specifying another type of wireless or wired event.

In addition, computer 124 may obtain one or more video-service performance metrics associated with the video call from computer 126. For example, the one or more video-service performance metrics may include: a latency, jitter (such as a standard deviation in the latency), a bit rate or a data rate, packet or frame loss, and/or information specifying another type of video-service event.

Furthermore, computer 124 may diagnose a type of problem experienced at electronic device 114-1 during the video call based at least in part on the one or more communication-performance metrics and the one or more video-service performance metrics using a pretrained machine-learning model. For example, the one or more communication-performance metrics and the one or more video-service performance metrics may be inputs to the pretrained machine-learning model, and the diagnosed type of problem may be an output from the pretrained machine-learning model. In some embodiments, computer 124 may use the inputs and the output to dynamically update or retrain the machine-learning model. Note that the pretrained machine-learning model may include a neural network, another type of supervised-learning model or a type of unsupervised-learning model. In some embodiments, computer 124 may include an integrated circuit that implements a pretrained machine-learning model, such as one or more graphical processor units.

In some embodiments, the diagnosed type of problem may include one or more types of problems in a network (such as the WLAN and/or a LAN) and/or with the video-call service. Alternatively or additionally, the diagnosed type of problem may identify, where an anomaly or an error is occurring in the network and/or the video-call service. Furthermore, the diagnosed type of problem may indicate an absence of a problem. For example, the diagnosed type of problem may indicate that electronic device 114-1 (and, thus, the network) is 'video-call ready.'

Additionally, computer 124 may provide, to electronic device 114-1, corrective information that specifies the diagnosed type of problem. Note that the corrective information may include or specify a remedial action to correct the diagnosed type of problem. Alternatively or additionally, computer 124 may selectively perform the remedial action to the correct the diagnosed type of problem. For example, the remedial action may include: an adjustment or modification to one or more components in a network (such as access point 112-1), a change in a configuration of the video-call service, and/or an alert or an alarm (e.g., to an operator or administrator of a WLAN, a LAN or a network).

While the preceding discussion illustrated the communication techniques with operations performed by and/or interaction with a user of electronic device 114-1, in some embodiments at least some of the aforementioned operations are automated. For example, after receiving the request for the testing, the remaining operations may be performed without human intervention (e.g., by the user) or automatically. This may allow the user of electronic device 114-1 to initiate the testing and diagnosis of the type of problem by performing a single operation, such as providing the request for the testing. Alternatively, the user may need to provide the request for the testing and then to accept the invitation, e.g., by activating the selectable link that may be included in the invitation.

Thus, in some embodiments, the user may initiate the testing (and the remaining operations in the communication techniques) by performing one or two operations. However, in other embodiments, computer 124 may initiate the testing, e.g., based on a request from computer 126, such as when computer 126 detects or estimates that there is a type of problem associated with the video-call service at electronic device 114-1. In these embodiments, the communication techniques may perform the testing and the diagnosis of the type of problem without action by the user.

Moreover, while the preceding embodiments illustrated the communication techniques with a video-call service, in other embodiments, the communication techniques may be performed in conjunction with a wide variety of services (instead of a video-call service) and/or a wide variety of networks (such as a cellular-telephone network). Note that the video-call service may be provided by a third party or the same entity as the provider of the analytics service.

Furthermore, while the preceding embodiments illustrated the communication techniques with the content being provided by computer 124, in other embodiments at least some of the content may be provided by another component in a network (such as access point 112-1) instead of or in addition to computer 124. For example, the requisite content may be preinstalled on access point 112-1 and may be provided based at least in part on an instruction provided by computer 124 (and, more generally, an instruction from a remotely, located electronic device). This capability may facilitate assessing communication performance of a portion of the network and, thus, diagnosing the type of problem.

In these ways, the communication techniques may facilitate improved quality of service or an improved user experience when using the video-call service. Notably, the communication techniques may facilitate root-cause analysis (such as diagnosing the type of problem and/or identify a location of the type of problem or error) and appropriate corrective or remedial action. For example, the pretrained machine-learning model may allow automated interpretation of the one or more communication-performance metrics and/or the one or more video-call performance metrics. Consequently, the communication techniques may enhance reliability and the user experience when using the video-call service.

In the described embodiments, processing a frame or a packet in a given one of the one or more access points 112 or a given one of the one or more electronic devices 114 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or controller 116. As another example, in another embodiment, different electronic devices are transmitting and/or receiving frames or packets.

Figure 2:
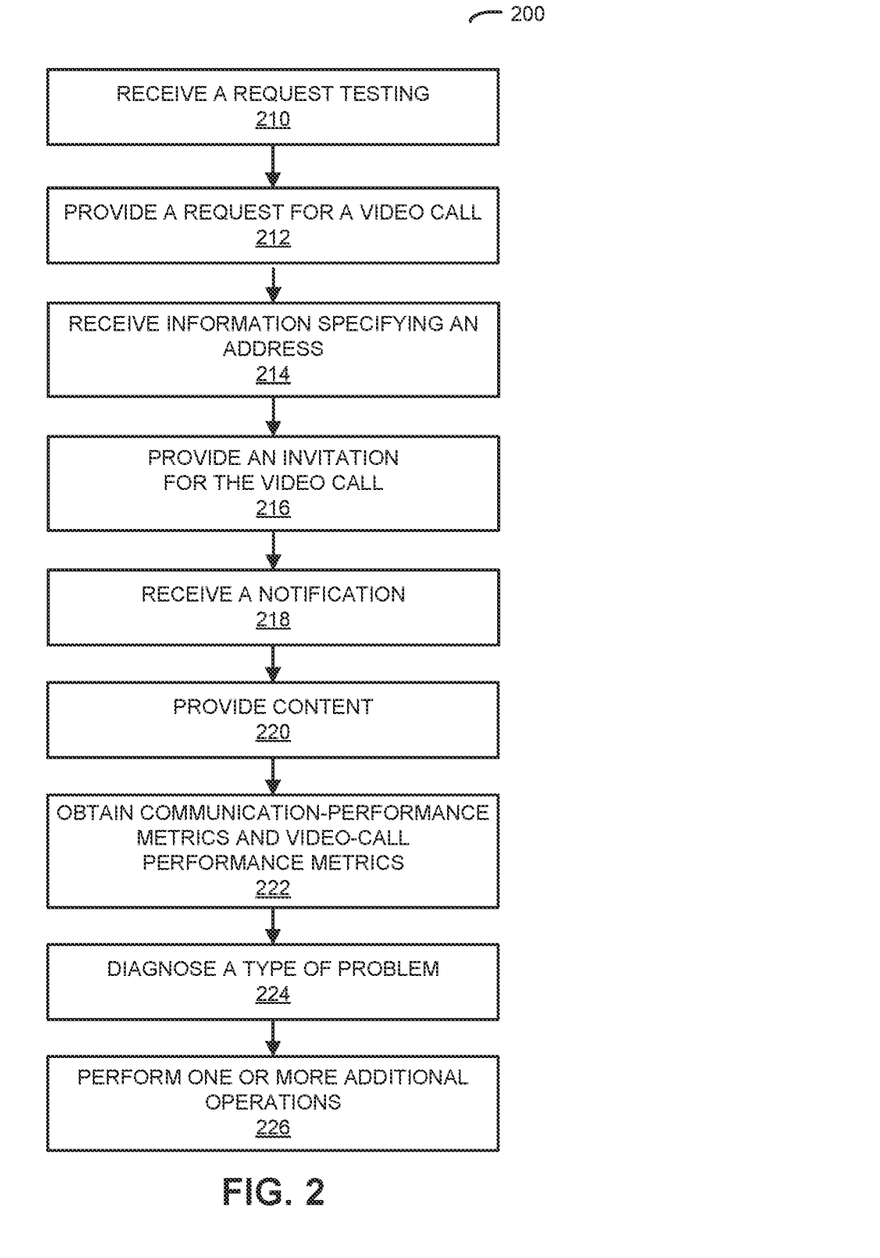
FIG. 2 is a flow diagram illustrating an example method for diagnosing a type of problem using an electronic device in the system in FIG. 1 in accordance with an embodiment of the present disclosure.

We now describe embodiments of the method. FIG. 2 presents an example of a flow diagram illustrating an example method 200 for diagnosing a type of problem. Moreover, method 200 may be performed by an electronic device, such as computer 124 in FIG. 1.

During operation, the electronic device may receive, associated with a second electronic device in a network, a request for testing (operation 210). In response, the electronic device may provide, addressed to a computer associated with a video-call service, a request for a video call (operation 212).

Then, the electronic device may receive, associated with the computer, information specifying an address (operation 214) associated with the video call.

Moreover, the electronic device may provide, addressed to the second electronic device, an invitation for the video call (operation 216), where the invitation includes address information corresponding to the address. Note that the address information specifying the address may include a selectable link to the address, such as a hypertext link.

When the electronic device receives, associated with the computer, a notification (operation 218) that the video call has started, the electronic device may provide content (operation 220) addressed to the computer and intended for the second electronic device. This content may include audio and/or video. Moreover, the content may be predefined. For example, the content may test performance of the network and/or the video-call service.

Next, the electronic device may obtain communication-performance metrics (operation 222) associated with communication via the network during the video call and video-service performance metrics (operation 222) associated with the video call. The communication-performance metrics may include end-to-end communication performance, e.g., from a gateway or a switch to the second electronic device. In some embodiments, the communication-performance metrics include communication-performance metrics associated with a backhaul network. Moreover, the video-service performance metrics may be obtained from the computer.

Furthermore, the electronic device may diagnose a type of problem (operation 224) experienced at the second electronic device during the video call based at least in part on the communication-performance metrics, the video-service performance metrics and a pretrained machine-learning model. For example, the communication-performance metrics and the video-service performance metrics may be inputs to the pretrained machine-learning model, and the diagnosed type of problem may be an output from the pretrained machine-learning model. Moreover, the electronic device may use the inputs and the output to dynamically update or retrain the machine-learning model.

In some embodiments, the pretrained machine-learning model may include a neural network or another type of supervised-learning model. For example, the machine-learning model may use or may be based at least in part on one or more of a wide variety of learning techniques, such as a classifier or a regression model that was trained using: a supervised learning technique, such as: a support vector machine, a classification and regression tree, logistic regression, LASSO, linear regression and/or another linear or nonlinear supervised-learning technique.

Note that the diagnosed type of problem may include one or more types of problems in the network and/or with the video-call service. Alternatively or additionally, the diagnosed type of problem may identify where an anomaly or an error is occurring in the network and/or the video-call service. In some embodiments, the diagnosed type of problem may indicate an absence of a problem. For example, the diagnosed type of problem may indicate that the second electronic device (and, thus, the network) is 'video-call ready.'

In some embodiments, the electronic device optionally performs one or more additional operations (operation 226). For example, the electronic device may select the content based at least in part on an estimated type of problem experienced at the second electronic device. Moreover, the electronic device may estimate the type of problem based at least in part on information included in the request for the testing.

Furthermore, the electronic device may provide, addressed to the second electronic device, corrective information that specifies the diagnosed type of problem. Note that the corrective information may include or specify a remedial action to correct the diagnosed type of problem.

Alternatively or additionally, the electronic device may selectively perform the remedial action to the correct the diagnosed type of problem. For example, the remedial action may include: an adjustment or modification to the network, a change in a configuration of the video-call service, and/or an alert or an alarm.

Additionally, the electronic device may include an integrated circuit that implements a pretrained machine-learning model. For example, the integrated circuit may include one or more graphical processor units.

In some embodiments, some of the aforementioned operations are automated. For example, after receiving the request for the testing (operation 210), the remaining operations may be performed without human intervention or automatically. This may allow a user of the second electronic device to initiate the testing and diagnosis of the type of problem by performing a single operation, such as providing the request for the testing. Alternatively, the user may need to perform two operations, such as providing the request for the testing and then accepting the invitation, e.g., by activating the selectable link that may be included in the invitation.

In some embodiments of method 200, there may be additional or fewer operations. Moreover, there may be different operations. Furthermore, the order of the operations may be changed, and/or two or more operations may be combined into a single operation.

Figure 3:
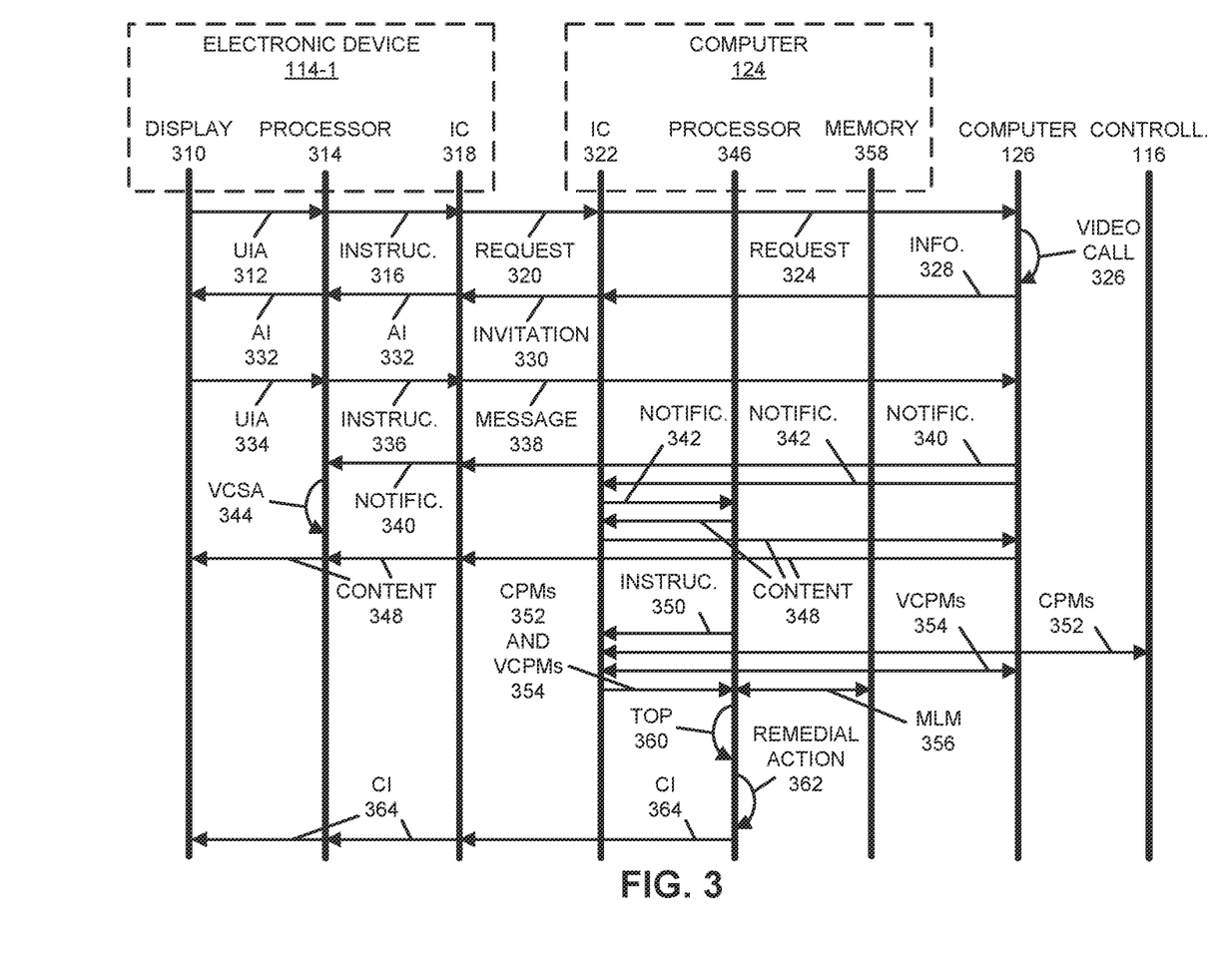
FIG. 3 is a drawing illustrating an example of communication among electronic devices in FIG. 1 in accordance with an embodiment of the present disclosure.

FIG. 3 presents a drawing illustrating an example of communication between electronic device 114-1, controller 116, computer 124 and computer 126. In FIG. 3, a user of electronic device 114-1 may interact with a user interface presented on a display 310 (such as a touch-sensitive display) on electronic device 114-1 to provide user-interface activity (UIA) 312 specifying a request 320 for testing. For example, the user may activate a physical button or a virtual icon in or associated with the user interface. Based at least in part on user-interface activity 312, processor 314 in electronic device 114-1 may provide instruction 316 to interface circuit (IC) 318 in electronic device 114-1 to provide request 320.

After receiving request 320, interface circuit 322 in computer 124 may provide a request 324 for a video call 326 to computer 126 based at least in part on request 320. Moreover, after receiving request 124, computer 126 may schedule video call 326 and may provide information 328 specifying an address associated with video call 326 to computer 124.

Moreover, in response to receiving information 328, interface circuit 322 may provide an invitation 330 for video call 326 to electronic device 114-1, where invitation 330 includes address information (AI) 332 corresponding to the address. For example, address information 332 may include a selectable link to the address. Then, interface circuit 322 may provide address information 332 to processor 314, which displays address information 332 on display 310.

Next, the user may interact with the user interface presented on a display 310 to provide user-interface activity 334 specifying acceptance of invitation 330 and/or initiation of video call 326. For example, the user may activate a physical button or a virtual icon in or associated with the user interface, such as a virtual icon associated with the selectable link, Based at least in part on user-interface activity 334, processor 314 may instruct 336 interface circuit 318 to provide a message 338 to computer 126 to start video call 326.

In response to message 338, computer 126 may start video call 326 with electronic device 114-1 and computer 124 by providing notification 340 to electronic device 114-1 and notification 342 to computer 124. After receiving notification 340, interface circuit 318 may provide notification 340 to processor 314, which may launch a video-call service application (VCSA) 344. Moreover, after receiving notification 342, interface circuit 322 may provide notification 342 to processor 346 in computer 124, which may provide content 348 to interface circuit 322. Next, interface circuit 322 may provide content 348 during video call 326 to electronic device 114-1 via computer 126.

Furthermore, while video call 326 is ongoing or once video call 326 is completed, processor 346 may instruct 350 interface circuit 322 to obtain, from controller 116, one or more communication-performance metrics (CPMs) 352 associated with communication with electronic device 114-1 during video call 326. For example, the one or more communication-performance metrics 352 may have been collected and provided to controller 116 by one or more of access points 112 during video call 326. Additionally, based at least in part on instruction 350, interface circuit 322 may obtain, from computer 126, one or more video-service performance metrics (VSPMs) 354 associated with video call 326.

Then, interface circuit 322 may provide the one or more communication-performance metrics 352 and the one or more video-service performance metrics 354 to processor 346. Processor 346 may use the one or more communication-performance metrics 352 and the one or more video-service performance metrics 354, and a pretrained machine-learning model (MLM) 356 (which is access in memory 358 in computer 124) to diagnose a type of problem (TOP) 360 experienced at electronic device 114-1 during video call 326.

Moreover, processor 346 may selectively perform a remedial action 362 to correct the diagnosed type of problem 360. Alternatively or additionally, processor 346 may provide corrective information (CI) 364 that specifies the diagnosed type of problem 360 and/or remedial action 362 to electronic device 114-1 via interface circuit 322. After receiving corrective information 364, interface circuit 318 may provide corrective information 364 to processor 314, which presents corrective information 364 on display 310.

While FIG. 3 illustrates some operations using unilateral or bilateral communication (which are, respectively, represented by one-sided and two-sided arrows), in general a given operation in FIG. 3 may involve unilateral or bilateral communication.

Figure 4:
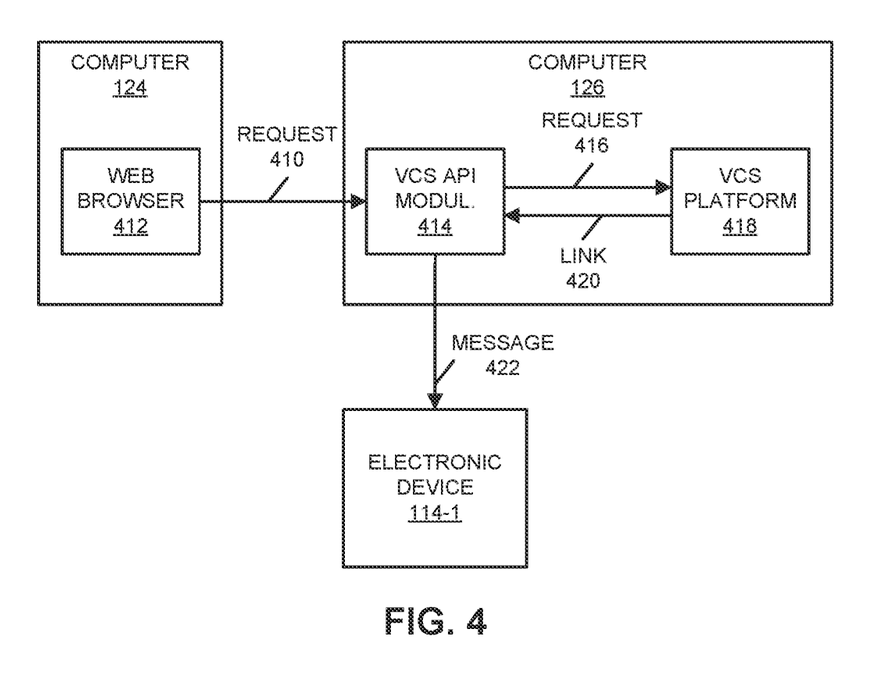
FIG. 4 is a drawing illustrating an example of a technique for diagnosing a type of problem during a video call in accordance with an embodiment of the present disclosure.

In some embodiments, the communication techniques are used to test a video-call capability of an electronic device (including communication with the electronic device) and/or diagnose a type of problem that occurs during instances of a video call with the electronic device. Notably, as shown in FIG. 4, which presents a drawing illustrating an example of a technique for diagnosing a type of problem during a video call, computer 124 may provide a request 410 for the video call (such as a test call) to a video-call-service (VCS) application programming interface (API) module 414 in computer 126 via a Web browser interface 412. Note that request 410 may include an email address of a user. In response, video-call-service application programming interface module 414 may provide a request 416 for the video call to a video-call-service platform or engine 418. Based at least in part on request 416, video-call-service platform 418 may generate a link 420 for the video call, which is provided to video-call-service API module 414. Then, video-call-service API module 414 may provide a message 422 to the user with link 420. The user may receive message 422 at electronic device 114-1.

Figure 5:
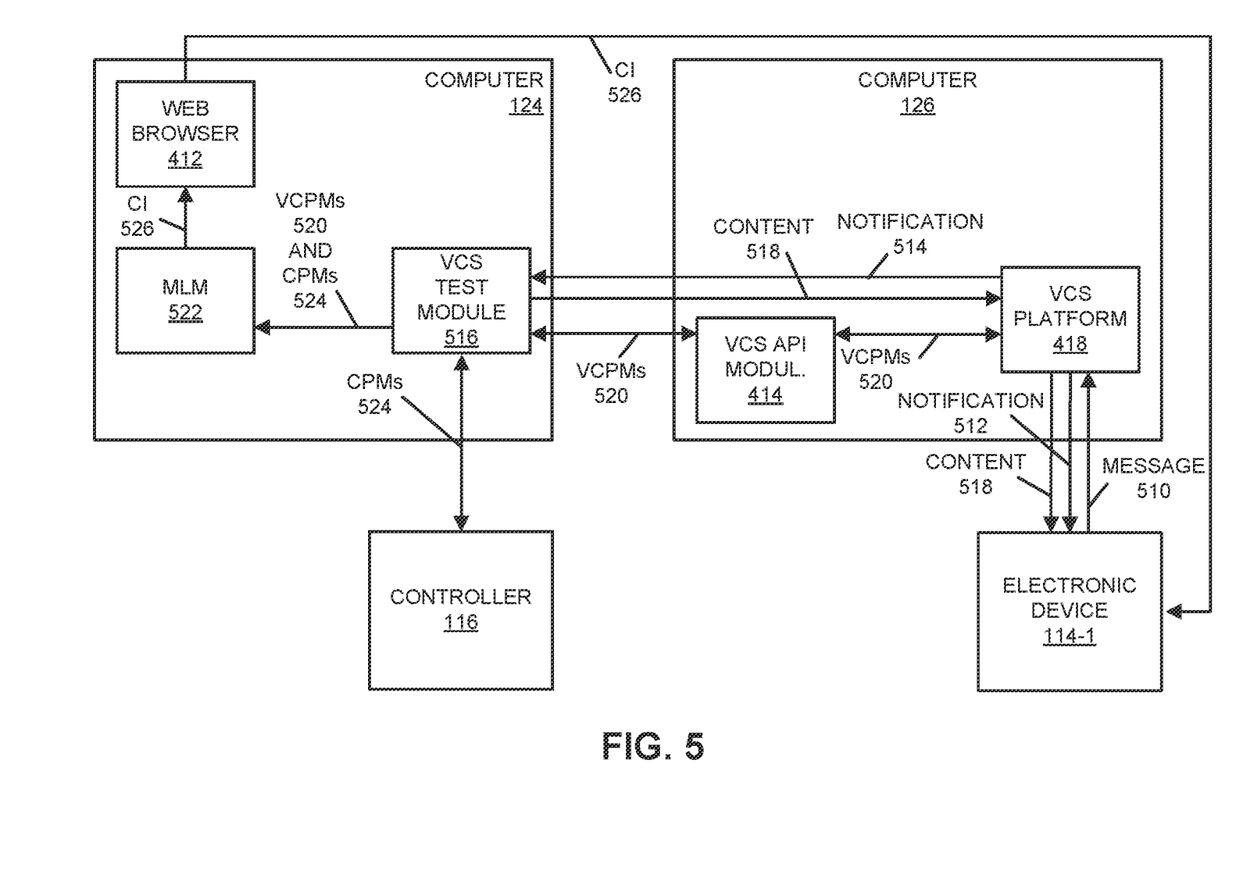
FIG. 5 is a drawing illustrating an example of a technique for diagnosing a type of problem during a video call in accordance with an embodiment of the present disclosure.

As shown in FIG. 5, which presents a drawing illustrating an example of a technique for diagnosing a type of problem during a video call, the user of electronic device 114-1 may activate link 420 in message 422, which may cause electronic device 114-1 to provide a message 510 to an address in link 420 of computer 126. After receiving notification 510, video-call-service platform 418 may initiate the video call by providing notification 512 to electronic device 114-1 and notification 514 to computer 124. During the video call, a video-call-service test module 516 in computer 124 may provide content 518 (such as an audio and video test feed) to video-call-service platform 418, which provides content 518 to electronic device 114-1.

Moreover, during and/or after the video call, video-call-service test module 516 may request video-call service performance metrics 520 associated with the video call via video-call-service API module 414 and video-call-service platform 418. The video-call service performance metrics 520 may be provided to machine-learning module (MLM) 522 in computer 124. In addition, communication-performance metrics 524 in a network, which are associated with the video call, may be obtained by video-call-service test module 516 from controller 116 and provided to machine-learning module 522.

Then, machine-learning module 522 may use video-call service performance metrics 520, communication-performance metrics 524 and a pretrained machine-learning model to diagnose a type of error during the video call at electronic device 114-1. For example, the type of problem may include: a problem with electronic device 114-1, a problem with computer 126, a problem with the video-call service, a problem with the network, a problem with a backhaul connection, etc. Moreover, machine-learning module 522 may provide corrective information 526 (such as call quality analysis and root-cause analysis) to an administrator of the network via a Web browser interface 412 and/or to the user of electronic device 114-1.

Figure 6:
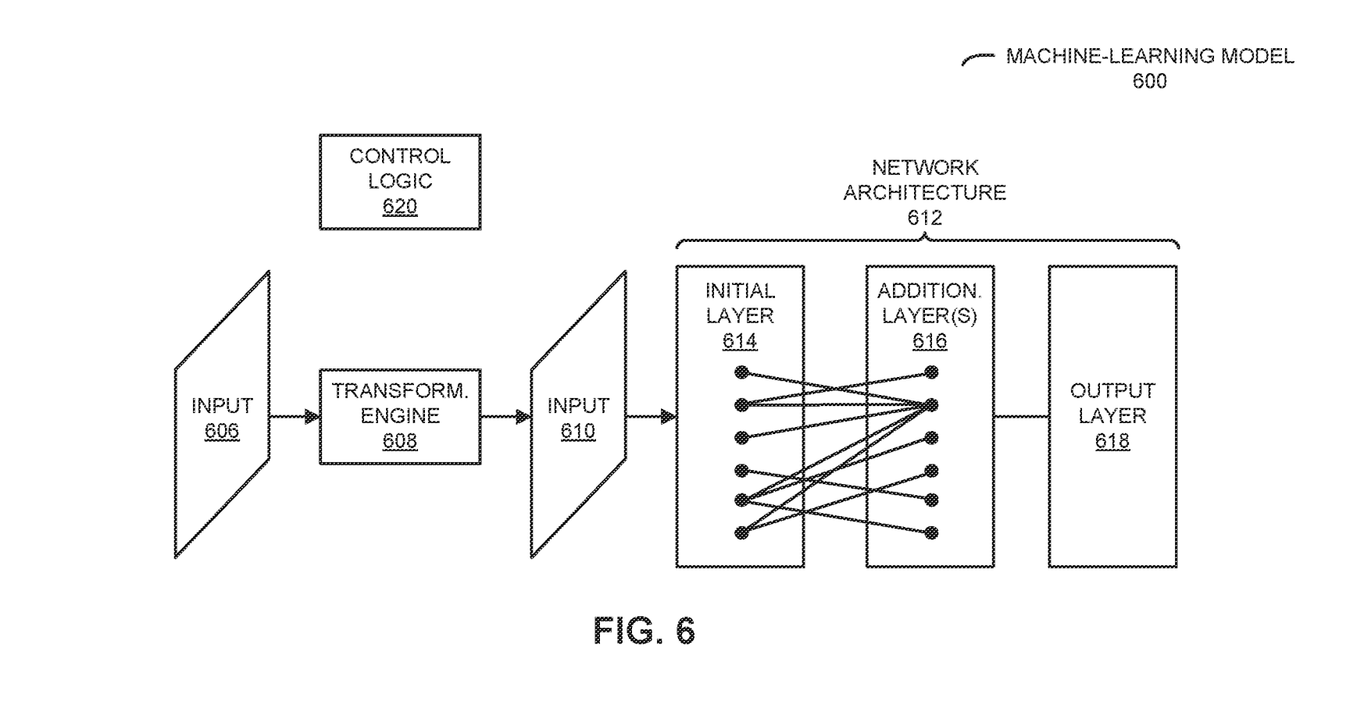
FIG. 6 is a drawing illustrating an example of a machine-learning model in accordance with an embodiment of the present disclosure.

FIG. 6 presents a drawing illustrating an example of a machine-learning model 600, Notably, machine-learning model 600 may be implemented using a neural network. This neural network may include a network architecture 612 that includes: an initial layer 614 that, e.g., provides filtering of input 610; an additional layer(s) 616 that apply weights; and an output layer 618 that performs regression or classification (such as prediction of an occurrence of a type of problem, such as an anomaly or an error). Note that the details with the different layers in machine-learning model 600, as well as their interconnections, may define network architecture 612. In some embodiments, machine-learning model 600 is reformulated as a series of matrix multiplication operations.

Machine-learning model 600 may be able to handle the real-world variance in 1 million events or more. However, machine-learning model 600 may be trained or developed based at least in part on input 610 corresponding to events associated with packets or frames having particular formats (such as a format that is compatible with one or more communication protocols or standards), Thus, machine-learning model 600 may have an input receptive field that expects a particular type of input. Nonetheless, in general an initial input 606 may have a different format. For example, relative to input 610, input 606 may have one of a variety of formats or representations.

Thus, in order to analyze input 606 using machine-learning model 600, it may need to be transformed using one or more pre-processing transformations by transformation engine, module or circuit 608 into input 610. Note that the one or more pre-processing transformations may include: computing counts of different types of events, aggregating counts as a function of time, calculating differences in counts as a function of time, normalizing counts, etc.

Machine-learning model 600 may specify the one or more pre-processing transformations performed by transformation engine 608. Alternatively, control logic 620 may analyze input 606 to select the one or more pre-processing transformations performed by transformation engine 608. Thus, in some embodiments, the one or more pre-processing transformations (and, more generally, front-end processing of input 606) may be optimized (such as by using hyperparameter optimization), and may be performed by machine-learning model 600 and/or control logic 620 (such as one or more processors).

Note that machine-learning model 600 may be used to analyze an input or a sequence of inputs, such as information that specifies the different types of events in the network during different time intervals (such as 1, 5, 10, 30 or 60 min.).

In some embodiments, machine-learning model 600 includes layers of detectors. These model features may be reused in different machine-learning models (as opposed to randomly retraining a new machine-learning model).

We now describe embodiments of a neural network. In a typical training regime, a large neural network model may include 60 M parameters and 650,000 neurons. The neural network model may include eight learned layers with weights, including five layers and three fully connected layers with a final 1000-way softmax that produces a distribution over the 1000 class labels. Some of the learned layers may be followed by max-pooling layers. In order to make training faster, the neural network model may use non-saturating neurons (such as a local response normalization) and an efficient dual parallelized GPU implementation of the operation(s). In addition, in order to reduce overfitting in the fully-connected layers, a regularization technique (which is sometimes referred to as 'dropout') may be used. In dropout, the predictions of different models are efficiently combined to reduce test errors. Notably, the output of each hidden neuron is set to zero with a probability of 0.5. The neurons that are 'dropped out' in this way do not contribute to the forward pass and do not participate in backpropagation. Note that the neural network model may maximize the multinomial logistic regression objective, which may be equivalent to maximizing the average across training cases of the log-probability of the correct label under the prediction distribution.

In some embodiments, the kernels of the second, fourth, and fifth layers are coupled to those kernel maps in the previous layer that reside on the same GPU. The kernels of the third layer may be coupled to all kernel maps in the second layer. Moreover, the neurons in the fully connected layers may be coupled to all neurons in the previous layer. Furthermore, response-normalization layers may follow the first and second layers, and max-pooling layers may follow both response-normalization layers as well as the fifth layer. A nonlinear model of neurons, such as Rectified Linear Units, may be applied to the output of every fully-connected layer.

In some embodiments, the first layer filters a 224×224×3 input with 96 kernels of size 11×11×3 with a stride of four pixels (this is the distance between the receptive field centers of neighboring neurons in a kernel map). Note that the second layer may take as input the (response-normalized and pooled) output of the first layer and may filter it with 256 kernels of size 5×5×48. Furthermore, the third, fourth, and fifth layers may be coupled to one another without any intervening pooling or normalization layers. The third layer may have 384 kernels of size 3×3×256 coupled to the (normalized, pooled) outputs of the second layer, Additionally, the fourth layer may have 384 kernels of size 3×3×192, and the fifth layer may have 256 kernels of size 313×192. The fully-connected layers may have 4096 neurons each. Note that the numerical values in the preceding and the remaining discussion below are for purposes of illustration only, and different values may be used in other embodiments.

In some embodiments, the neural network model is implemented using at least two GPUs. One GPU may run some of the layer parts while the other runs the remaining layer parts, and the CPUs may communicate at certain layers. The input of the neural network model may be 150,528-dimensional, and the number of neurons in the remaining layers in the neural network model may be given by 253,440-186,624-64,896-64,896-43,264-4096-4096-1000.

The neural network model may be pretrained on a quantitative training dataset. During the training, the neural network model may be repeatedly subjected to the training input set and retrained using a backpropagation technique, in which errors in the output from the neural network model may be used as feedback to adjust the parameters in the neural network model until the output error in the measurement results reaches some minimum level (such as 1, 5, 10, 20 or 30%).

We now describe embodiments of an electronic device, which may perform at least some of the operations in the communication techniques. For example, the electronic device may include a component in FIG. 1, such as one of: the one or more access points 112, the one or more electronic devices 114, controller 116 and/or computer 124. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, graphical processor units and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory (which collectively or individually are sometimes referred to as a 'computer-readable storage medium'). In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720.) For example, networking subsystem 714 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist, Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7, Also, although separate subsystems are shown in FIG. 7, in some embodiments some or all of a given subsystem or component can be integrated into one or more of the other subsystems or components in electronic device 700. For example, in some embodiments program instructions 722 are included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714 and/or other functionality of electronic device 700. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carder frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF). Calera GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit configured to communicate with a second electronic device in a network and a computer associated with a video-call service;
   memory storing program instructions; and
   a processor, coupled to the interface circuit and the memory, configured to execute the program instructions, wherein the electronic device is configured to:
   receive, associated with the second electronic device, a request for testing;
   provide, addressed to the computer, a request for a video call based at least in part on the request for testing;
   receive, associated with the computer, information specifying an address associated with the video call;
   provide, addressed to the second electronic device, an invitation for the video call, wherein the invitation comprises address information corresponding to the address;
   when the electronic device receives, associated with the computer, a notification that the video call has started, provide content addressed to the computer and intended for the second electronic device;
   obtain communication-performance metrics associated with communication via the network during the video call and video-service performance metrics associated with the video call; and
   diagnose a type of problem experienced at the second electronic device during the video call based at least in part on the communication-performance metrics, the video-service performance metrics and a pre-trained machine-learning model.

2. The electronic device of claim 1, wherein the address information specifying the address comprises a selectable link to the address.

3. The electronic device of claim 1, wherein the content comprises predefined audio and video.

4. The electronic device of claim 3, wherein the electronic device is configured to select the content based at least in part on an estimated type of problem experienced at the second electronic device.

5. The electronic device of claim 4, wherein the electronic device is configured to estimate the type of problem based at least in part on information included in the request for the testing.

6. The electronic device of claim 1, wherein the communication-performance metrics correspond to end-to-end communication performance in the network.

7. The electronic device of claim 1, wherein the communication-performance metrics comprise communication-performance metrics associated with a backhaul network.

8. The electronic device of claim 1, wherein the video-service performance metrics are obtained from the computer.

9. The electronic device of claim 1, wherein the electronic device is configured to provide, addressed to the second electronic device, corrective information that specifies the diagnosed type of problem.

10. The electronic device of claim 9, wherein the corrective information comprises or specifies a remedial action to correct the diagnosed type of problem.

11. The electronic device of claim 1, wherein the electronic device is configured to selectively perform a remedial action to the correct the diagnosed type of problem.

12. The electronic device of claim 11, wherein the remedial action comprises at least one of: an adjustment or modification to the network, a change in a configuration of the video-call service, or an alert or an alarm.

13. The electronic device of claim 1, wherein the electronic device comprises an integrated circuit, coupled to the processor, that implements the pretrained machine-learning model.

14. The electronic device of claim 1, wherein the pretrained machine-learning model comprises a neural network or another type of supervised-learning model.

15. The electronic device of claim 1, wherein the diagnosed type of problem comprises one or more types of problems in the network, with the video-call service or both.

16. The electronic device of claim 1, wherein the diagnosed type of problem identifies where an anomaly or an error is occurring in the network, the video-call service or both.

17. The electronic device of claim 1, wherein the diagnosed type of problem indicates an absence of a problem.

18. A non-transitory computer-readable storage medium for use in conjunction with an electronic device, the computer-readable storage medium storing program instructions, wherein, when executed by the electronic device, the program instructions cause the electronic device to perform one or more operations comprising:

receiving, associated with a second electronic device in a network, a request for testing;

providing, addressed to a computer associated with a video-call service, a request for a video call based at least in part on the request for testing;

receiving, associated with the computer, information specifying an address associated with the video call;

providing, addressed to the second electronic device, an invitation for the video call, wherein the invitation comprises address information corresponding to the address;

when the electronic device receives, associated with the computer, a notification that the video call has started, providing content addressed to the computer and intended for the second electronic device;

obtaining communication-performance metrics associated with communication via the network during the video call and video-service performance metrics associated with the video call; and diagnosing a type of problem experienced at the second electronic device during the video call based at least in part on the communication-performance metrics, the video-service performance metrics and a pretrained machine-learning model.

19. The non-transitory computer-readable storage medium of claim 18, wherein the one or more operations comprise selectively performing a remedial action to the correct the diagnosed type of problem.

20. A method for diagnosing a type of error, comprising: by an electronic device:

receiving, associated with a second electronic device in a network, a request for testing;

providing, addressed to a computer associated with a video-call service, a request for a video call based at least in part on the request for testing;

receiving, associated with the computer, information specifying an address associated with the video call;

providing, addressed to the second electronic device, an invitation for the video call, wherein the invitation comprises address information corresponding to the address;

when the electronic device receives, associated with the computer, a notification that the video call has started, providing content addressed to the computer and intended for the second electronic device;

obtaining communication-performance metrics associated with communication via the network during the video call and video-service performance metrics associated with the video call; and diagnosing a type of problem experienced at the second electronic device during the video call based at least in part on the communication-performance metrics, the video-service performance metrics and a pretrained machine-learning model.

* * * * *